United States Patent
Majomard et al.

(10) Patent No.: US 12,284,708 B2
(45) Date of Patent: Apr. 22, 2025

(54) METHOD FOR SELECTION BETWEEN FAST RETRAIN PROCEDURES

(71) Applicant: Marvell Asia Pte Ltd, Singapore (SG)

(72) Inventors: Seid Alireza Razavi Majomard, Belmont, CA (US); Ehab Tahir, Mississauga (CA)

(73) Assignee: Marvell Asia Pte Ltd, Singapore (SG)

( * ) Notice: Subject to any disclaimer, the term of this patent is extended or adjusted under 35 U.S.C. 154(b) by 540 days.

(21) Appl. No.: 17/587,269

(22) Filed: Jan. 28, 2022

(65) Prior Publication Data

US 2022/0240336 A1  Jul. 28, 2022

Related U.S. Application Data

(60) Provisional application No. 63/143,010, filed on Jan. 28, 2021.

(51) Int. Cl.
*H04W 76/18* (2018.01)
*H04W 76/19* (2018.01)

(52) U.S. Cl.
CPC ........... *H04W 76/18* (2018.02); *H04W 76/19* (2018.02)

(58) Field of Classification Search
CPC ............................. H04W 76/18; H04W 76/19
See application file for complete search history.

(56) References Cited

U.S. PATENT DOCUMENTS

| | | | |
|---|---|---|---|
| 6,445,733 B1 * | 9/2002 | Zuranski | H04L 47/10 370/252 |
| 11,228,465 B1 * | 1/2022 | Sedarat | H04L 25/4975 |
| 2001/0048667 A1 * | 12/2001 | Hamdi | H04L 5/143 370/252 |

FOREIGN PATENT DOCUMENTS

WO   WO-0110105 A1 *  2/2001  ......... H04L 5/1438

* cited by examiner

*Primary Examiner* — Brenda H Pham (57) ABSTRACT

A link between a PHY device and a link partner is established by performing link training. If the link becomes at least partially inoperable, a first fast retrain technique is executed. A signature indicating that the first fast retrain technique successfully began but failed during execution before completion of the first fast retrain technique is received at the PHY device. In response to receiving the signature, a second fast retrain technique is executed.

20 Claims, 4 Drawing Sheets

METHOD FOR SELECTION BETWEEN FAST RETRAIN PROCEDURES

CROSS-REFERENCE TO RELATED APPLICATION

This disclosure claims the benefit under 35 U.S.C. § 119(e) of U.S. Provisional Patent Application No. 63/143,010, filed Jan. 28, 2021, which is hereby incorporated by reference herein in its entirety.

FIELD OF USE

This disclosure is related generally to communication networks and, more particularly, to selection of fast retrain techniques.

BACKGROUND

When initially establishing a link between two physical layer transceivers (PHYs) over a long distance, e.g. a 100-meter cable, a lot of training is necessary to adjust and compensate for signal issues such as echo cancellation and different types of cross talk (e.g. far-end cross talk (FEXT) and near-end cross talk (NEXT)), and any other undesired effect on a signal in the communication pathway. This initial training can take a long time. Once the link is established and the PHY devices enter data mode, electromagnetic interference from external sources caused by emission, radiation, and induction may degrade the quality of the link and cause a link to become wholly or partially inoperative, sometimes referred to as a link drop. In this situation, it is preferable to not need to repeat the entire lengthy retrain process again, but instead implement a fast retrain (FR) process to quickly reestablish the link.

There are two different techniques currently in use for fast retrain (FR) in 10/5/2.5G BASE-T products—the IEEE FR as described in the IEEE standards 802.3az (10G) and 802.3bz (2.5/5G) and the Cisco FR method. Implementations from different vendors may have seemingly minor difference, for instance because of how standards requirements may be interpreted. Other techniques may also be employed. However, not all devices are capable of performing all retrain techniques, and even those that can may be better at performing one technique or another. If the specification for a PHY device claims to be capable of a fast retrain method, but in fact it is not, then the link may be continuously dropped when that fast retrain method is attempted. Additionally, a PHY device may not support the same method of fast retrain as the link partner. Ultimately, a first link partner may not know which fast retrain techniques are supported by a second link partner, which can cause delays in reestablishing a dropped link.

SUMMARY

There is need for an effective way for a PHY device to be able to find the fast retrain technique properly supported by the link partner. One method for selecting a fast retrain technique begins by establishing a link between a PHY device and a link partner by performing link training. Then, a first fast retrain technique is executed. The link partner sends a signature to the PHY device indicating that the first fast retrain technique successfully began but failed during execution before completion of the first fast retrain technique. In response to receiving the signature, a second fast retrain technique is executed.

In some implementations, the first fast retrain technique may comprise a first plurality of steps and the signature may contain an indication of which step among the first plurality of steps of the first fast retrain technique failed during execution. The second fast retrain method may be executed because it is determined to not include the step of the first fast retrain technique that failed during execution of the first fast retrain technique. The second fast retrain method may also be a modified version of the first fast retrain method wherein the step which failed during execution has been modified in a way that has a higher chance of passing.

In some implementations, in response to executing the first fast retrain technique, a counter is incremented. When it is determined that this counter is greater than a predetermined threshold, the second fast retrain technique is executed.

In some implementations, the first fast retrain technique is performed in response to determining that the link became at least partially inoperative. The first fast retrain technique may alternatively be performed before the link enters a data mode for transferring data between the physical layer device and the link partner.

The PHY device may store a list of fast retrain techniques supported by the link partner. In some suitable approaches, the first fast retrain technique may be removed from the list of fast retrain techniques supported by the link partner in response to the indication that the first fast retrain technique successfully began but failed during execution. In some implementations, if all fast retrain techniques are removed from the list, the link is reestablished by performing a full link training, different from any previously performed fast retrain technique.

In some implementations, the first fast retrain technique may be executed because the PHY device prefers the first fast retrain technique.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
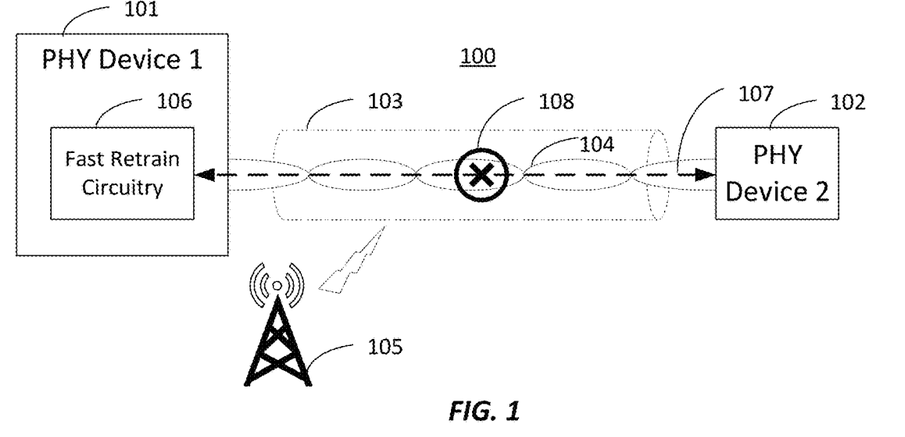
FIG. 1 is a block diagram illustrating two linked PHY devices subject to interference.

FIG. 1 is a block diagram illustrating a link between two PHY devices with interference impacting the quality of the link which may incorporate implementations of the subject matter of this disclosure, according to some implementations described herein. In the example implementation shown in FIG. 1, the network 100 includes PHY devices 101 and 102 communicating over a link. PHY devices 101 and 102 each contain both transmitter and receiver parts. PHY device 101 includes fast retrain circuitry 106 which performs fast retrain techniques from a list of fast retrain techniques maintained by PHY device 101 that are supported by PHY device 102. Link 103 is a bidirectional connection established over a cable or a wireless communication channel. In some implementations, link 103 may be a cable containing a twisted copper wire pair 104. Any number of PHY devices may be included in the Ethernet network 100 of FIG. 1. In some implementations, the Ethernet link may occur in an automotive setting. External electromagnetic interference source 105 creates noise which can interfere with the link between PHY devices 101 and 102. External electromagnetic interference source 105 may come from, for instance, an external radio broadcast tower, noise from internal equipment in an automotive environment, any combination thereof, and/or or any other nearby electromagnetic interference source. When external electromagnetic interference source 105 generates electromagnetic interference that impacts the link, a retrain procedure is necessary to reestablish the link quickly. Typically, a fast retrain technique is used to reduce the time necessary at least to reinstate the impacted link. PHY devices 101 and 102 may each support multiple different fast retrain techniques, and PHY device 101 may need to determine what fast retrain techniques are supported by PHY device 102. Fast retrain circuitry 106 in PHY device 101 maintains a list of fast retrain techniques supported by PHY device 102. If the link between PHY devices 101 and 102 becomes at least partially inoperable, a fast retrain technique 107 is implemented. If fast retrain circuitry 106 receives an indication 108 that a fast retrain technique failed or is not supported by PHY device 102, it will remove the fast retrain technique from the maintained list of fast retrain techniques supported by PHY device 102.

Figure 2:
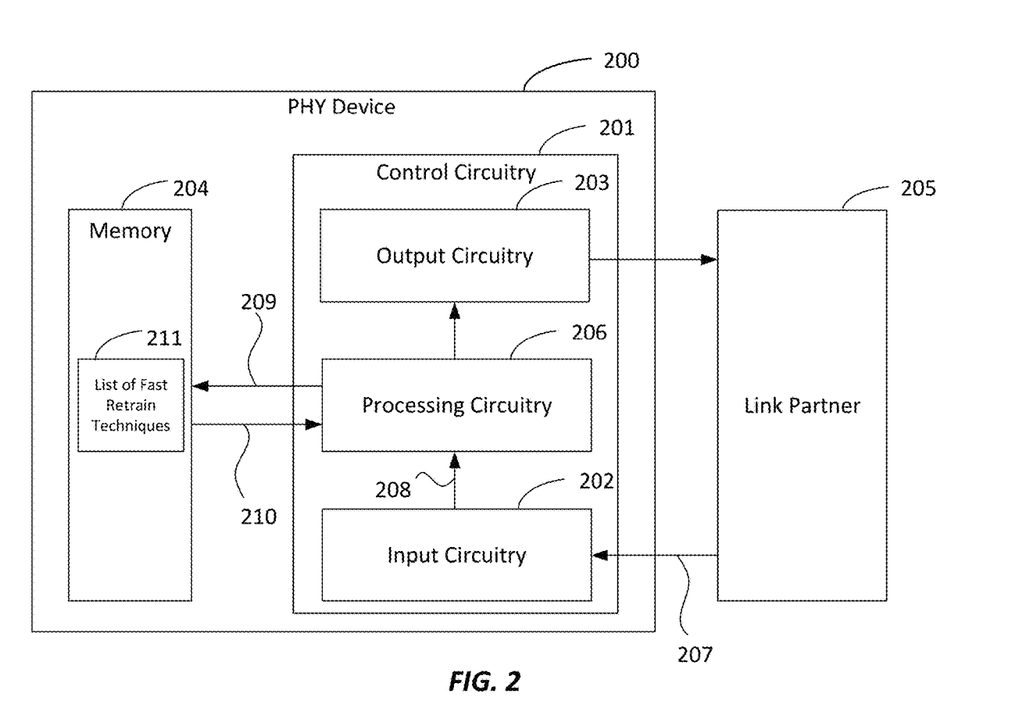
FIG. 2 is a block diagram illustrating components and data flow therebetween if a PHY device configured to implement a method for selecting a fast retrain technique in a network connection according to some implementations of the subject matter of this disclosure.

FIG. 2 is a high-level block diagram of a PHY device connected to a link partner with illustrative control circuitry configured to implement a method according to implementations of the subject matter of this disclosure. As shown in FIG. 2, a PHY device 200 contains control circuitry 201 and memory 204. Control circuitry 201 includes input circuitry 202 and output circuitry 203 which connect PHY device 200 to a link partner 205. Input circuitry 202 and output circuitry 203, collectively input and output (I/O) circuitry, may include any suitable combination of one or more of an Ethernet adapter, a IEEE 802.11 (WiFi) adapter, Bluetooth module, or any other suitable I/O circuitry. Memory 204 includes a list of fast retrain techniques 211 which tracks the fast retrain techniques supported by link partner 205.

The input circuitry 202 and output circuitry 203 connect link partner 205 to the PHY device 200 which can transmit and receive signals. In some implementations, these signals may be transmitted over an Ethernet connection. This connection is established through a standard link training process. If the link is dropped, it needs to be reestablished, typically by means of a fast retrain technique. When PHY device 200 needs to implement a fast retrain technique, it must determine which fast retrain technique is supported by its link partner 205. The link partner 205 may be configured to implement multiple fast retrain processes, only one, or not support fast retrain at all.

The input circuitry 202 is configured to receive, at 207, a signature from the link partner 205 that indicates the status of the fast retrain process. The signature may contain information such as the sequence that signals for fast retrain have been sent at, the timing of the signals, the step of the fast retrain method that is being executed, or any other suitable information about the communication pathway. In an implementation, the signature may be indicative of a particular FR technique or standard implemented by a vendor. Moreover, the signature may include indications of minor deviations, within acceptable tolerances, from a standard technique that ultimately can affect performance of the fast retrain. Input circuitry 202 transmits, at 208, the signature to processing circuitry 206. The signature may indicate that implemented fast retrain technique was successful. In response, processing circuitry 206 may, at 209, store, in memory 204, an indication that the link partner 204 is capable of the implemented fast retrain technique. In some cases, however, the signature may indicate that the fast retrain technique failed. In one example, the failure may occur because the link partner 204 is not capable of carrying the implemented fast retrain technique. In another example, the failure may be due to a problem with the connection between PHY device 200 and link partner 205 that is unrelated to the capability of link partner 205 to implement the fast retrain technique. In some implementations, the signature received by the input circuitry 202 indicates the source of the failure of the fast retrain technique, for instance a fast retrain step that could not be executed.

Processing circuitry 206 is configured to store, in memory 204, the success and/or failure of various fast retrain techniques when attempted with link partner 205. For example, the list of fast retrain techniques 211 may comprise a database or other data structure allowing additional information to be associated with each listed fast retrain technique. Processing circuitry 206 may also be configured to maintain a counter indicating the number of times that a fast retrain technique has failed. The value of the counter is incremented each time a signature is received indicating that a particular fast retrain technique has failed. In some implementations, the signature may include additional information regarding the failure, such as a particular step or process of the fast retrain technique at which the failure occurred, or whether the failure was due to a problem with the connection between PHY device 200 and link partner 205. Processing circuitry 206 may, in some implementations, store the counter in memory 204. In some implementations, link partner 205 may be determined to not support a first fast retrain technique after the value of the failure counter exceeds a threshold value. A fast retrain technique may fail due to issues not related to the ability of the link partner to support the fast retrain technique, such as connectivity issues with the communication pathway or a one-time failure of a step of the fast retrain technique. Maintaining a counter for the number of failures and setting a threshold number of failures before determining that a link partner cannot support a fast retrain method eliminates false determinations.

In some implementations, when the failure counter exceeds the threshold value, processing circuitry 206 selects an alternative fast retrain technique from the list of fast retrain techniques 211 supported by link partner 205. For example, a list of fast retrain techniques supported by PHY device 200 may be stored in memory 204. Alternatively or additionally, a list of fast retrain techniques 211 supported by link partner 205 may be stored in memory 204. Processing circuitry 206 retrieves, at 210, a second fast retrain technique from the list of supported fast retrain techniques 211 and attempts to perform fast retraining with link partner 205 using the second fast retrain technique that has not been indicated as having failed or exceeded a previous failure threshold.

In addition, in some implementations, a fast retrain technique that is determined to not be supported by the link partner may be removed from the list of fast retrain techniques 211 supported by the link partner 205. This determination may be made because the fast retrain technique has exceeded a threshold of previous failures. In some implementations, the threshold may be set at a single failure of a predetermined number of previous failures. For example, processing circuitry 206, after determining that the failure counter for a first fast retrain technique exceeds the threshold value, may access the stored list of fast retrain methods 211 supported by the link partner 205 and delete or mark as unavailable the failed fast retrain technique.

Figure 3:
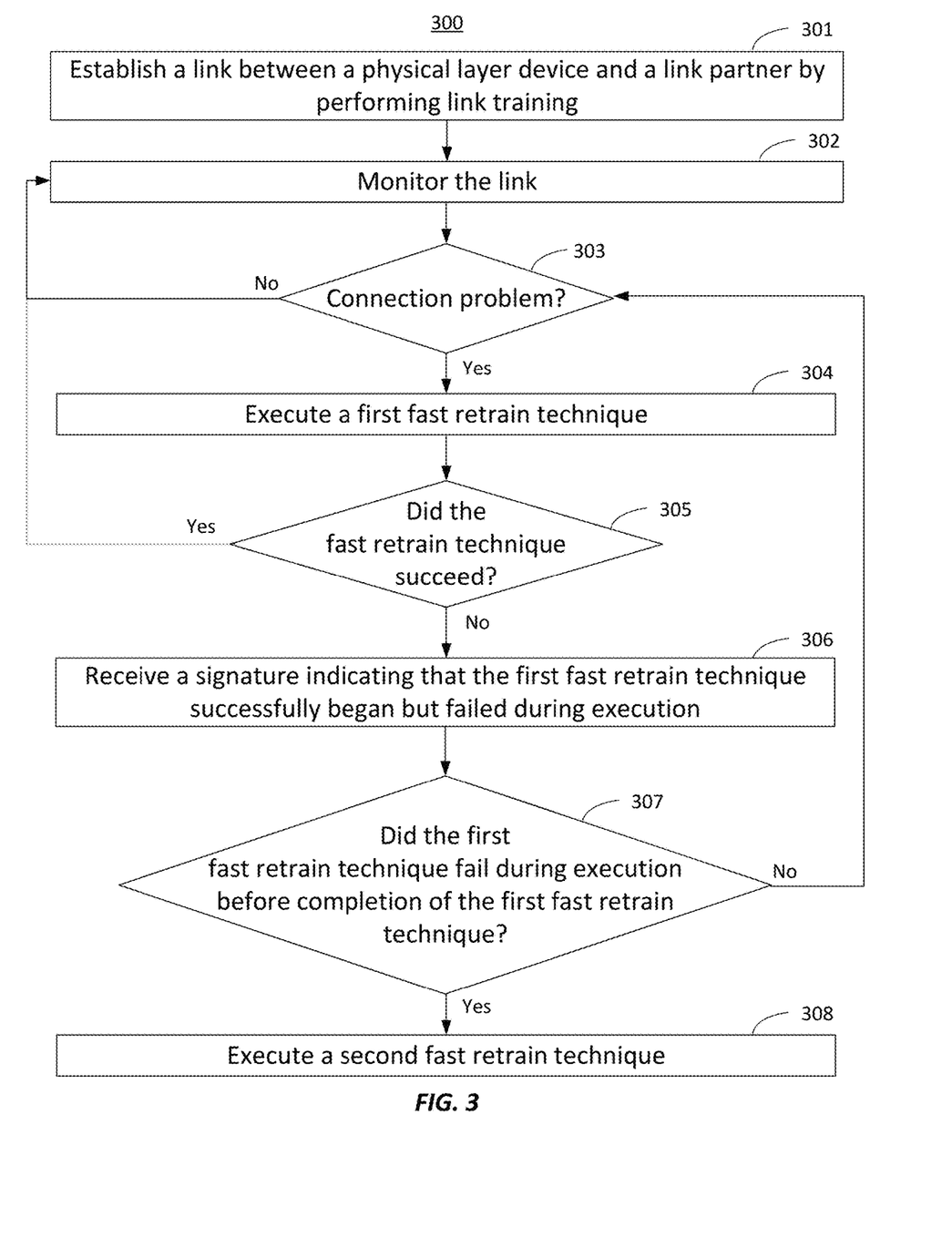
FIG. 3 is a flow diagram illustrating a method for selecting a fast retrain technique in a network connection according to some implementations of the subject matter of this disclosure.

FIG. 3 is a flow diagram illustrating a method according to implementations of the subject matter of this disclosure for selecting a fast retrain technique in a network connection described above. The method described in FIG. 3 may be implemented by control circuitry of a PHY device such as control circuitry 201.

At 301, control circuitry 201 establishes a link between a PHY device and a link partner by performing full link training. The process of link training allows the PHY device and the link partner to communicate with each other and tune their respective equalization settings so that they can communicate. The PHY device and the link partner send each other a list of data rate capabilities to begin the speed negotiation process to determine the speed at which data will be sent over the communication pathway. The PHY device and link partner will also send and receive training data over the communication pathway to train the connection.

At 302, control circuitry 201 monitors the link between the PHY device and the link partner and, at 303, determines whether the connection between the PHY device and the link partner has become partially inoperable. For example, the link may drop due to outside electromagnetic interference on the communication pathway. If no connection problems are detected ("No" at 303), then processing returns to 302 and control circuitry 201 continues monitoring the link.

If a connection problem is detected ("Yes" at 303, then, at 304, control circuitry 201 executes a first fast retrain technique. In some implementations, this first fast retrain technique may be executed in response to the link between the PHY device and the link partner dropping during data mode. In some embodiments, the first fast retrain technique may be forced to execute before the PHY device and the link partner enter data mode. In some embodiments, this fast retrain technique may comprise multiple steps which must be implemented. In some embodiments, the first fast retrain method is chosen from a list of fast retrain methods supported by the link partner that is stored at the PHY device. In some embodiments, the first fast retrain technique may be chosen because it is a favored fast retrain technique. It may be favored by the PHY device or the link partner. If the first fast retrain technique succeeds in reestablishing the link between the PHY device and the link partner ("Yes" at 305), then processing returns to 302 and control circuitry 201 continues monitoring the link.

If the first fast retrain technique fails in reestablishing the link between the PHY device and the link partner ("No" at 305), then, at 306, the control circuitry 201 receives a signature indicating that the first fast retrain technique successfully began but failed during execution. In some implementations, this signature may indicate at which step in the first fast retrain technique the technique failed. In some implementations, the memory of the PHY device may store a count of the number of times that the first fast retrain technique dropped the link. The first fast retrain method may be determined to have failed when this counter is larger than a threshold number. In some embodiments the threshold is adjustable. In some embodiments, the first fast retrain device may be removed from the list of fast retrain techniques supported by the link partner stored at the PHY device.

At 307, control circuitry 201 determines whether the signature indicates that the first fast retain technique failed during its execution and before completion of the first fast retrain technique. If not ("No" at 307), then the failure may not be due to fast retrain technique not being supported by the link partner and may be caused by a connection problem. Processing therefore returns to 303 to retry the first fast retrain technique.

If the signature indicates that the failure occurred during execution of the first fast retrain technique and before completion of the first fast retrain technique ("Yes" at 307), then the failure is likely due to the first fast retrain technique not being supported by the link partner and not due to a connectivity issue with the communication pathways or another external issue since the fast retrain signal was received, but the failure occurred after the process began. Accordingly, at 308, control circuitry 201 executes a second fast retrain technique. In some embodiments, the second fast retrain method is chosen from a list of fast retrain methods supported by the link partner that is stored at the PHY device. In some embodiments, this second fast retrain technique may be selected because it does not require the step which was indicated as having failed in the first fast retrain technique. In some implementations the indication is included in the signature. In some embodiments, if the second fast retrain technique is determined to have failed as well, it may be removed from the list of fast retrain techniques supported by the link partner stored at the PHY device. If this is the last of the fast retrain techniques in the list of fast retrain techniques supported by the link partner, a full retrain is implemented.

Figure 4:
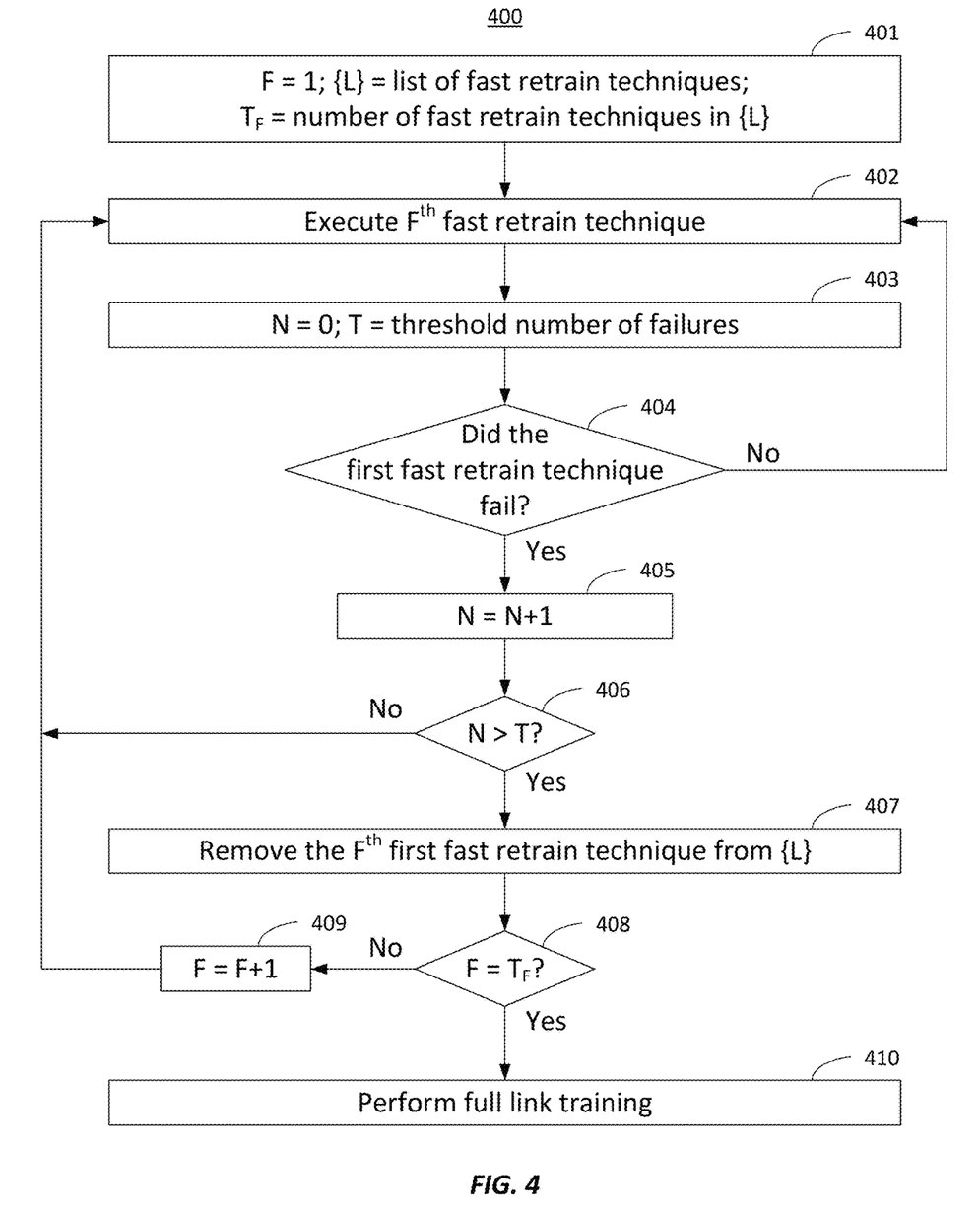
FIG. 4 is a flow diagram illustrating a method for maintaining a list of fast retrain techniques supported by the link partner according to some implementations of the subject matter of this disclosure.

FIG. 4 is a flow diagram illustrating a method according to implementations of the subject matter of this disclosure for maintaining a list of fast retrain techniques supported by the link partner. The method described in FIG. 4 may be implemented by control circuitry of a PHY device such as control circuitry 201.

PHY device 200 stores, e.g. in memory 204, a list {L} of fast retrain techniques. At 401, control circuitry 201 initializes a counter variable F, setting its value to one, and a variable $T_F$ representing the total number of fast retrain methods stored in {L}.

At 402, control circuitry 201 implements the $F^{th}$ fast retrain technique using input circuitry 202 and output circuitry 203. At 403, control circuitry 201 initializes a counter N for the number of failures is initialized and a predetermined threshold T is established. The value of N is initially set to zero. If the $F^{th}$ fast retrain technique does not fail ("No" at 404), then control circuitry 201 implements the $F^{th}$ fast retrain technique the next time the link becomes at least partially inoperable. If the $F^{th}$ fast retrain technique fails ("Yes" at 404), then, at 405, control circuitry 201 increments the value of N by one.

At 406, control circuitry 201 determines whether the value of N is greater than a predetermined threshold T. If control circuitry 201 determines that N is less than the predetermined threshold T ("No" at 406), then processing returns to 402 where the control circuitry again executes the $F^{th}$ fast retrain technique. If control circuitry 201 determines that the value of N is greater than the predetermined threshold T ("Yes" at 406), then, at 407, control circuitry 201 removes the $F^{th}$ fast retrain technique from the list {L} of FR techniques that was supported by the link partner.

At 408, control circuitry 201 determines whether the $F^{th}$ fast retrain technique was the last fast retrain technique stored in the list {L} by comparing the value of F to that of IF. If F is not equal to IF, meaning that the $F^{th}$ fast retrain technique was not the last fast retrain technique ("No" at 408), then, at 409, control circuitry 201 increments the value of counter F by one, thereby moving to the next fast retrain technique in the list {L}. Processing then returns to 402 at which control circuitry 201 executes the $F^{th}$ fast retrain technique. If F is equal to $T_F$, meaning that the $F^{th}$ fast retrain technique was the last fast retrain technique ("Yes" at 408), then there are no fast retrain techniques left to execute and the control circuitry, at 410, reestablishes the link through a full link training.

Figure 5:
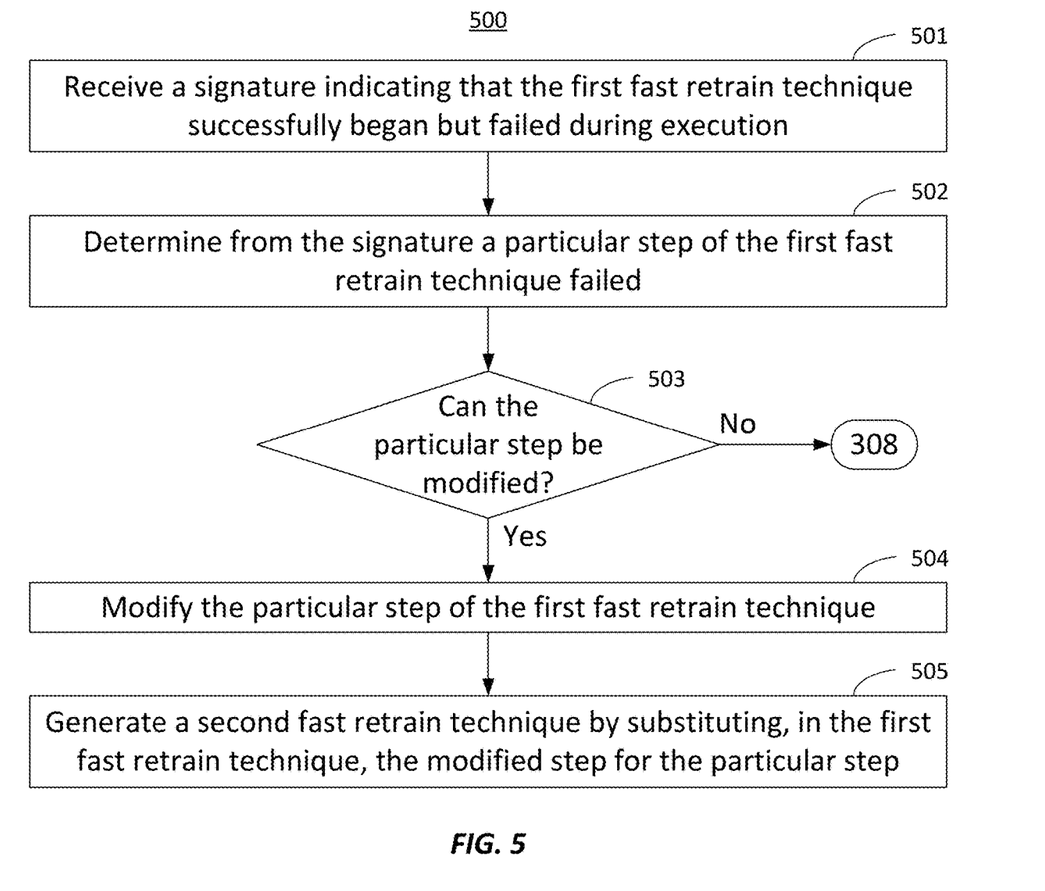
FIG. 5 is a flow diagram illustrating a method for modifying a step of a fast retrain method which failed during execution according to some implementations of this disclosure.

FIG. 5 is a flow diagram illustrating a method for modifying a step of a fast retrain method which failed during execution according to some implementations of this disclosure. The method described in FIG. 5 may be implemented by control circuitry of a PHY device such as control circuitry 201.

At 501, control circuitry 201 receives a signature indicating that the first fast retrain technique successfully began but failed during execution. The signature may contain information such as the sequence that signals for fast retrain have been sent at, the timing of the signals, the step of the fast retrain method that is being executed, or any other suitable signal characteristics. At 502, control circuitry 201 determines, from the signature, at which step of the first fast retrain technique it failed. For example, control circuitry 201 may read, extract, or otherwise access information from the signature indicating a particular step of the fast retrain method at which the failure occurred.

At 503, control circuitry 201 determines if the step of the first fast retrain method that failed can be modified to be more likely to succeed. Modifications may include, for example, changing the order of the signals sent during fast retrain need, shortening or lengthening the timing the signals are sent at, deleting a step, inserting a step, or any other suitable changes to the fast retrain method. These modifications may deviate the fast retrain technique from the way PHY device 200 typically implements fast retrain. In some implementations, these changes may be made based on known information about the functionalities of the determined version of the firmware, software, or hardware used by link partner 205. The version of the firmware, software, or hardware of the link partner 205 may be determined by the signature received at 501, a signature received during initial full link training, or any other signal received from link partner 205.

If the step that failed during execution cannot be modified ("No" at 503), then control circuitry 201 selects a second fast retrain method supported by the link partner. This may be accomplished using methods described above in connection with FIG. 3. If the step that failed during execution can be modified ("Yes" at 503), then, at 504, control circuitry 201 modifies the step of the fast retrain technique. At 505, the control circuitry generates a second fast retrain method by substituting the modified step for the step that failed in the first fast retrain method.

Figure 6:
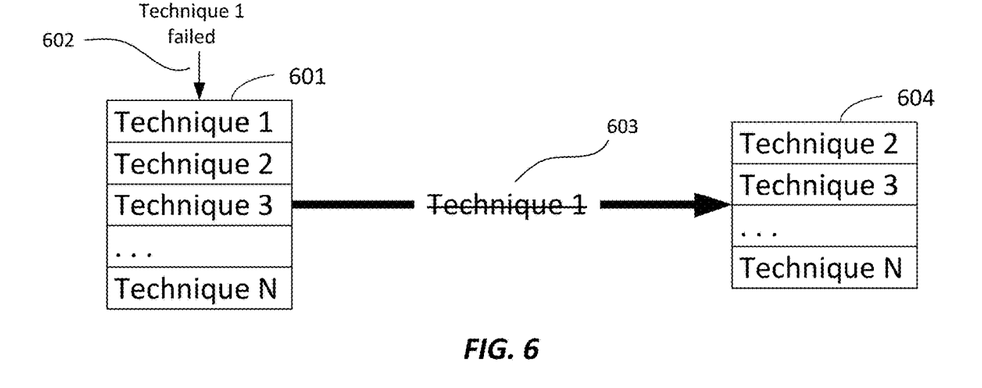
FIG. 6 is a block diagram illustrating a dynamic list of fast retrain methods updated after a fast retrain method failed during execution according to some implementations of this disclosure.

FIG. 6 is a block diagram illustrating a dynamic list of fast retrain methods updated after a fast retrain method failed during execution according to some implementations of this disclosure. In the example implementation shown at FIG. 6, list of fast retrain techniques 601 contains N number of fast retrain techniques and is an example of the list of fast retrain techniques 211 stored at memory 204 of PHY device 200. In an implementation, the list 601 includes different fast retrain techniques such as IEEE FR as described in the IEEE standards 802.3az (10G) and 802.3bz (2.5/5G) and the Cisco FR technique, as well as different vendor specific support for those techniques which in practice may produce different results when fast retraining a dropped link.

Control circuitry 201 receives a signal 602 indicating that fast retrain technique 1 has failed. The signal may be a signature received from link partner 205, or may be a signal generated within PHY device 200 in response to a determination (e.g., based on a signature) that the fast retrain technique has failed. Control circuitry 201 is then configured to send a signal 603 to memory 204 deleting fast retrain technique 1 from the stored list of fast retrain techniques. The list of fast retrain techniques 604, which does not include fast retrain technique 1, is now stored at memory 204.

Various implementations discussed in conjunction with FIGS. 1-6 may be performed by various electronic components of one or more electronic circuits, such as but not limited to an integrated circuit, application-specific integrated circuit (ASIC), and/or the like. These implementations may also be performed by one or more firmware or software components. Various components discussed throughout this disclosure are configured to include a set of electronic circuit components, and communicatively operate on one or more electronic circuits. Each electronic circuit is configured to include any of, but not limited to logic gates, memory cells, and/or the like. Various implementations and components disclosed herein are configured to be at least partially operated and/or implemented by processor-executable instructions stored on one or more transitory or non-transitory processor-readable media.

While various implementations of the subject matter of the present disclosure have been shown and described herein, such implementations are provided by way of example only. Numerous variations, changes, and substitutions relating to implementations described herein are applicable without departing from the subject matter of this disclosure. It is noted that various alternatives to the implementations of the subject matter of this disclosure described herein may be employed in practicing the subject matter of this disclosure. Furthermore, the operations described herein need not be performed in the order shown or described. It is intended that the following claims define the scope of the subject matter of this disclosure and that methods and structures within the scope of these claims and their equivalents be covered thereby.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for selecting a fast retrain technique in a network connection, the method comprising:

establishing a link between a physical layer device and a link partner by performing link training;

in response to determining that the link has become at least partially inoperative, executing a first fast retrain technique, including executing each retraining step of a first plurality of retraining steps;

receiving a signature indicating that the first fast retrain technique successfully began but failed during execution before completion of the first fast retrain technique;

in response to receiving the signature, and based on the indication that the first fast retrain technique successfully began but failed during execution, executing a second fast retrain technique different from the first fast retrain technique.

2. The method of claim 1, wherein the signature contains an indication of which retraining step among the first plurality of retraining steps of the first fast retrain technique failed during execution.

3. The method of claim 2, wherein executing the second fast retrain technique further comprises selecting the second fast retrain technique to have a second plurality of retraining steps that does not include the retraining step of the first fast retrain technique that failed during execution of the first fast retrain technique.

4. The method of claim 2, wherein executing a second fast retrain technique different from the first fast retrain technique comprises:
generating a second plurality of retraining steps comprising the first plurality of retraining steps;
replacing, in the second plurality of steps, the retraining step among the first plurality of retraining steps which failed during execution of the first fast retrain technique with a modified retraining step;
executing the second plurality of retraining steps.

5. The method of claim 1 wherein executing a second fast retrain technique different from the first fast retrain technique based on the indication that the first fast retrain technique successfully began but failed during execution before the completion of the first fast retrain technique further comprises:
in response to executing the first fast retrain technique, incrementing a counter;
determining whether the counter has a value that is greater than a predetermined threshold;
in response to determining that the counter has a value that is greater than the predetermined threshold, executing the second fast retrain technique.

6. The method of claim 1, wherein executing the first fast retrain technique is performed in response to determining that the link became at least partially inoperative.

7. The method of claim 1 further comprising:
storing, at the physical layer device, a list of fast retrain techniques supported by the link partner.

8. The method of claim 7 further comprising:
in response to receiving the signature, and based on the indication that the first fast retrain technique successfully began but failed during execution of the first fast retrain technique, removing the first fast retrain technique from the list of fast retrain techniques supported by the link partner.

9. The method of claim 1 further comprising:
receiving a second signature indicating that the second fast retrain technique successfully began but failed during execution before completion of the second fast retrain technique;

in response to receiving the second signature, and based on the indication that the second fast retrain technique successfully began but failed during execution, reestablishing the link between the physical layer device and the link partner by performing a full link training that is different from both the first fast retrain technique and the second fast retrain technique.

10. The method of claim 1 wherein executing a first fast retrain technique comprises:
retrieving from the physical layer device a favored fast retrain technique;
executing the favored fast retrain technique.

11. The physical layer device of claim 1, wherein the control circuitry is configured, when executing the first fast retrain technique, to:
retrieve from a memory in the physical layer device a favored fast retrain technique;
execute the favored fast retrain technique.

12. A physical layer device configured to select a fast retrain technique in a network connection, the physical layer device comprising:
input/output (I/O) circuitry configured to establish a link between the physical layer device and a link partner by performing link training;
control circuitry configured to:
in response to determining that the link has become at least partially inoperative, execute, using the I/O circuitry, a first fast retrain technique, including executing each retraining step of a first plurality of retraining steps;
receive, using the I/O circuitry, a signature indicating that the first fast retrain technique successfully began but failed during execution before completion of the first fast retrain technique;
in response to receiving the signature, and based on the indication that the first fast retrain technique successfully began but failed during execution, execute, using the I/O circuitry, a second fast retrain technique different from the first fast retrain technique.

13. The physical layer device of claim 12, wherein the control circuitry is further configured to:
execute, using the I/O circuitry, the first plurality of retraining steps of the first fast retrain technique; and
identifying, based on the signature, which retraining step among the first plurality of retraining steps of the first fast retrain technique failed during execution.

14. The physical layer device of claim 13, wherein the second fast retrain technique comprises a second plurality of retraining steps and wherein the control circuitry is further configured to:
determine that the second plurality of retraining steps of the second fast retrain technique does not include the retraining step among the first plurality of retraining steps of the first fast retrain technique failed during execution before completion of the first fast retrain technique;
execute, using the I/O circuitry, the second plurality of retraining steps of the second fast retrain technique.

15. The physical layer device of claim 13, wherein the control circuitry is further configured to, when executing, using the I/O circuitry, a second fast retrain technique different from the first fast retrain technique, to:
generate a second plurality of retraining steps comprising the first plurality of retraining steps;
replace, in the second plurality of retraining steps, the retraining step among the first plurality of retraining steps which failed during execution of the first fast retrain technique with a modified retraining step;
execute the second plurality of retraining steps.

16. The physical layer device of claim 12, wherein the control circuitry is further configured when executing a second fast retrain technique different from the first fast retrain technique based on the indication that the first fast retrain technique successfully began but failed during execution before the completion of the first fast retrain technique to:
in response to executing the first fast retrain technique using the I/O circuitry, increment a counter;
determine whether the counter has a value that is greater than a predetermined threshold;
in response to determining that the counter has a value that is greater than the predetermined threshold, execute, using the I/O circuitry, the second fast retrain technique.

17. The physical layer device of claim 12, wherein the control circuitry is further configured to execute, using the I/O circuitry, the first fast retrain technique in response to determining that the link became at least partially inoperative.

18. The physical layer device of claim 12 further comprising:
memory; and
wherein the control circuitry is further configured to:
store, at the memory, a list of fast retrain techniques supported by the link partner.

19. The physical layer device of claim 18, wherein the control circuitry is further configured to:
in response to receiving the signature, and based on the indication that the first fast retrain technique successfully began but failed during execution of the first fast retrain technique, remove the first fast retrain technique from the list of fast retrain techniques supported by the link partner.

20. The physical layer device of claim 12, wherein the control circuitry is further configured to:
receive a second signature indicating that the second fast retrain technique successfully began but failed during execution before the completion of the second fast retrain technique; and
the I/O circuitry further configured to:
in response to receiving the second signature, and based on the indication that the second fast retrain technique successfully began but failed during execution, reestablishing the link between the physical layer device and the link partner by performing a full link training that is different from both the first fast retrain technique and the second fast retrain technique.

* * * * *